E. M. AND J. O. PIERSON.
GRAIN TREATING SUPPLY TANK.
APPLICATION FILED MAY 1, 1920.
1,363,053.
Patented Dec. 21, 1920.
2 SHEETS—SHEET 1.
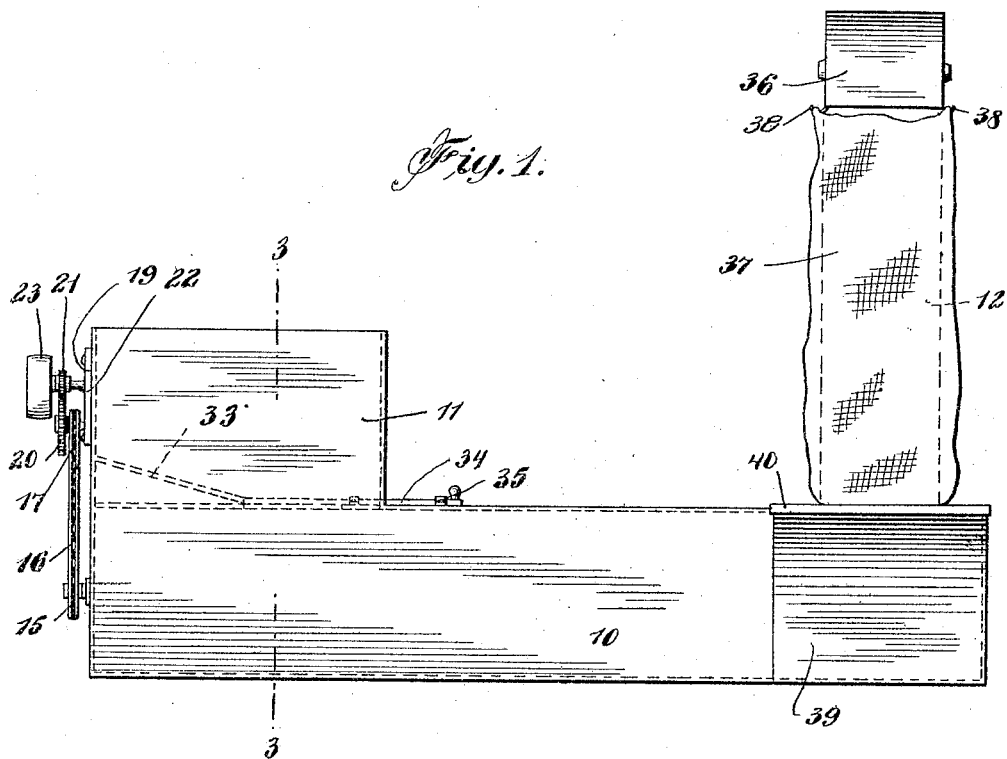
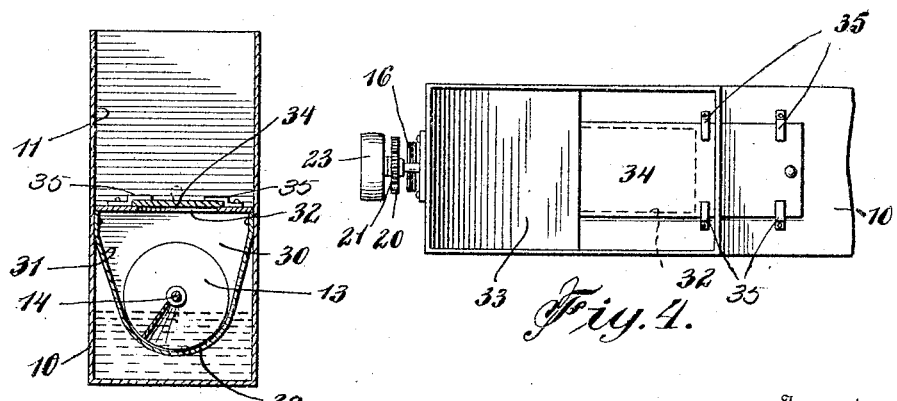
Inventor
E. M. Pierson
John O. Pierson
By Geo. F. Kimmel
Attorney E. M. AND J. O. PIERSON.
GRAIN TREATING SUPPLY TANK.
APPLICATION FILED MAY 1, 1920.
1,363,053.
Patented Dec. 21, 1920.
2 SHEETS—SHEET 2.
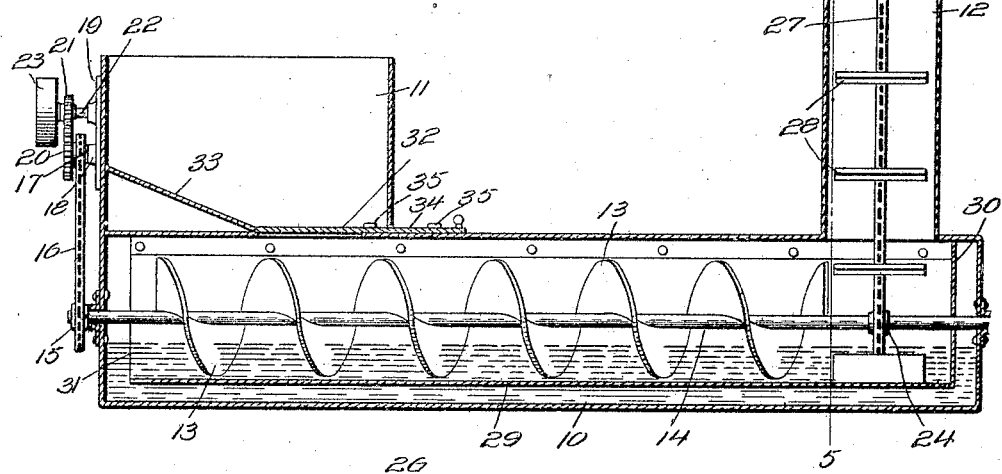
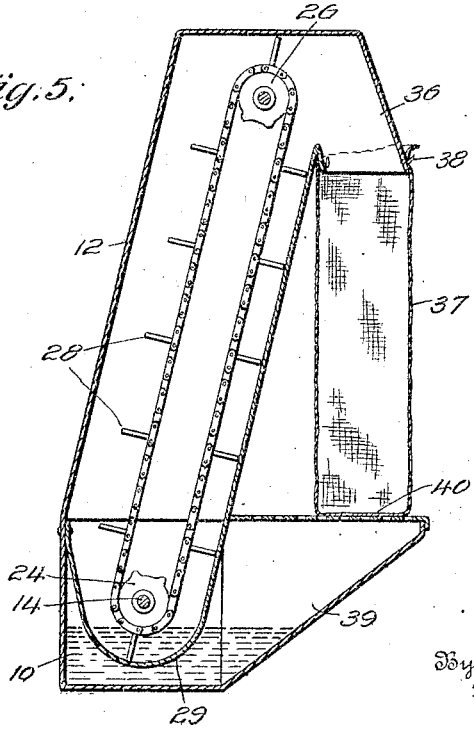
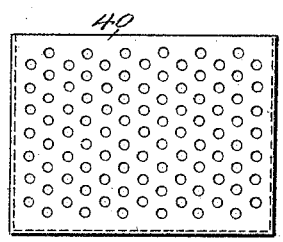
Inventor
E. M. Pierson.
John O. Pierson
By Geo. P. Kimmel
Attorney

UNITED STATES PATENT OFFICE.

JOHN O. PIERSON, OF ST. JOHN, AND EARL M. PIERSON, OF ALBION, WASHINGTON.

GRAIN-TREATING SUPPLY-TANK.

1,363,053.  Specification of Letters Patent. Patented Dec. 21, 1920.

Application filed May 1, 1920. Serial No. 378,334.

*To all whom it may concern:*

Be it known that we, JOHN O. PIERSON and EARL M. PIERSON, citizens of the United States, residing at St. John and Albion, respectively, in the county of Whitman and State of Washington, have invented certain new and useful Improvements in Grain-Treating Supply-Tanks, of which the following is a specification.

The invention relates to a seed treating apparatus, and more particularly to the class of grain treating devices, especially wheat grain.

The primary object of the invention is the provision of an apparatus of this character, wherein grain is delivered to a hopper, whence it is conveyed in a treating solution so as to prepare the grain for seeding purpose or the market, and finally the treated grain is elevated and discharged into sacks or bags, the sacks or bags being held in a novel manner so that any treating solution carried by the grain into the sacks can be returned into the machine thereby avoiding any waste of the treating solution, the grain during treatment being relieved of the smut germ, and also thoroughly cleaned.

Another object of the invention is the provision of an apparatus of this character, wherein the body thereof is of novel form, so that a bag, sack or the like can be suspended beneath the tray or discharge spout of the elevator and supported so that all treating solution carried by the grain into the sack will be trapped and returned into the body of the apparatus, thus eliminating any possibility of waste of the treating solution during the operation of the said apparatus.

A further object of the invention is the provision of an apparatus of this character, wherein the grain during the treating thereof, is automatically handled thus enabling the treatment of grain expeditiously with economy in the consumption of treating solution and without manual labor.

A still further object of the invention is the provision of an apparatus of this character, which is extremely simple in construction, eliminating the manual handling of the grain in the treatment thereof, thoroughly reliable, and efficient in its purpose, and inexpensive to manufacture.

With these and other objects in view, the invention consists in the features of construction, combination and arrangement of parts, as will be hereinafter fully described, illustrated in the accompanying drawing, and pointed out in the claims hereunto appended.

In the accompanying drawings:

Figure 1 is a side elevation of an apparatus constructed in accordance with the invention.

Fig. 2 is a vertical longitudinal sectional view thereof.

Fig. 3 is a sectional view on the line 3—3 of Fig. 1.

Fig. 4 is a fragmentary top plan view at the hopper end of the apparatus.

Fig. 5 is a vertical transverse sectional view on the line 5—5 of Fig. 2, looking in the direction of the arrows.

Fig. 6 is a detailed plan view of the drain plate employed in the apparatus.

Similar reference characters indicate corresponding parts throughout the several views of the drawings.

Referring to the drawings in detail—

The apparatus for the treatment of grain to prepare the same for seeding purposes or for the market, comprises a body 10, constituting a container for the solution used in the treating of the grain and this body is preferably of rectangular shape and may be of any required length, width and depth, while at one end portion of said body is formed a grain hopper 11, which rises vertically from said body and into which is adapted to be poured the grain to be treated. At the other end portion of the body 10 is a vertical elevator shaft or column 12, which may be of any desired height and rises from the top of said body 10.

Arranged centrally longitudinally within the body 10 is a spiral feeder or feed screw 13, the shaft 14 of which is suitably journaled in opposite ends of the body 10, the end of said shaft 14, adjacent to the hopper 11, is extended exteriorly of the body 10, and has fixed thereto a driven gear 15 over which is trained an endless sprocket chain 16, the same being also trained over a sprocket pinion 17 fixed to a stud countershaft 18, suitably journaled in a hanger 19, mounted exteriorly upon the hopper 11, the counter-shaft 18 being also fitted with a transmission gear 20, meshing with a companion gear 21, fixed to a driving shaft 22, the same being also provided with a belt wheel or pulley 23 on which is adapted to be trained a driving belt (not shown) operated from any suitable source of power so that motion from the driving shaft 22 can be imparted directly to the feed screw or spiral feeder 13, in the operation of the apparatus. The driving shaft 22, is journaled in the hanger 19 on the hopper 11 in any suitable manner.

Carried by the shaft 14 of the spiral feeder or feed screw 13 which is cut away for a distance immediately beneath the elevator column or shaft 12, is a driven sprocket gear 24, while journaled transversely on the elevator column or shaft 12, near the upper end thereof is an idle shaft 25 having a sprocket gear 26, thereon and trained over these gears 24 and 26, to travel vertically within the conveyer collar or shaft 12, is a conveyer or elevator including an endless chain 27, having fixed at intervals thereon wooden paddles 28, which draw the grain from the body 10 and lift the same within the elevator column or shaft 12, for the discharge of said grain after the treatment thereof, within said body 10 in a manner presently described.

Located within the body 10 is a conveyer or feed screw trough 29, which extends throughout a greater portion of the length of said body and has its forward closed end 30, terminating beyond the elevator column or shaft 12, while the opposite open end 31 of said trough 29, terminates a distance from the adjacent end of the body 10, so that said trough at this open end 31 is in direct communication with the body 10, for the admission of treating fluid or solution therein from the latter in the path of the grain when acted upon and advanced by the coil feeder or feed screw 13 in the operation of the apparatus.

The hopper 11 communicates with a trough 10 near the open end 31 thereof, through a gate-way or opening 32, formed in the top of the body 10, and within said hopper 11 is an inclined supplemental bottom 33 for directing the grain to the gate-way opening 32 when said grain is delivered to the hopper, the gate-way opening 32 being regulated by a slide gate 34, mounted upon the top of the body 10, between guides 35, which gate 34 is manually operated to close or vary the extent of the gate-way or opening 32 and thereby regulate the discharge of grain from the hopper 11 into the trough 29 where said grain is acted upon by the feeder or screw 13 to advance the same to the elevator which is operated simultaneously with the feeder or screw for elevating the grain after the treatment thereof, by the solution of liquid contained within the body 10 of the apparatus to remove the smut germ and also clean said grain for the use thereof in seeding purposes or for the market.

Formed at the upper end of the elevator shaft or column 12 and inclined laterally therefrom is a discharge spout 36 for receiving the grain from the paddles 28 of the elevator and discharge of said grain into a sack or bag 37, which is suspended from hooks 38 carried by the discharge spout 36 at opposite sides thereof, so that the bag will be held in receiving position beneath the mouth of the discharge spout 36, the bag 37 being readily detachable from the suspension hooks 38 when the same has become filled with grain.

Formed on the body 10, beneath the spout 36, is a trapping well 39, which is open at its upper end and over this upper open end is removably fitted a perforated drain plate 40, which also serves as a rest for the bottom of the bag or sack 37 when suspended from the hook 38 on the discharge spout 36, the well 39, being in communication with the body 10, so that any quantity of treating solution carried with the grain delivered into the sack or bag 37 can drain into the well or trap 39 through the drain plate 40 and return into the body 10 for the further use of the treatment thereby eliminating any possibility of waste and assuring economy in the use of the treating solution in the apparatus during the operation thereof.

In treating grain, as wheat, to remove the smut germ, it is necessary that the grain be immersed in or coated and agitated with a supply of germicide such as vitrol or other substance, which for convenience is provided in liquid form and the desired quantity is held within the body 10 so that the grain when advanced in the trough therein will be washed by the liquid to kill the germ and render the grain free of that fungus growth known as "smut." This being done more thoroughly through the circular motion of the wooden paddles before drawing the grain up the elevator. The grain after being treated by the solution is collected by the wooden paddles of the elevator and raised thereby in the elevator column or shaft 12 and delivered therefrom by the wooden paddles through the discharge spout into the bag or sack, the latter being readily removable from the apparatus when the same becomes filled with grain. It is of course understood that the apparatus is adaptable for treating grain seed, such as wheat, oats and the like, whereby to eliminate the smut germ from the grain, as well as washing said grain for the market.

From the foregoing, it is thought that the construction and manner of operation of the apparatus will be clearly understood and therefore a more extended explanation has been omitted.

What is claimed is:

1. An apparatus of the character described, comprising a body forming a liquid container, a hopper at one end of the body and having communication with the latter, a horizontal slide for regulating the communication between the hopper and the body, a column rising from the other end of the body and having a discharge spout at its upper end, an inclined well formed on the body beneath the discharge spout and communicating with said body a foraminous plate covering said well and supporting a detachable bag, a feed trough closed at one end and located within the body, a feed screw rotatably journaled in the body and working in said trough, an elevating mechanism within the elevator column for elevating substance from the trough and discharging the same into the discharge spout and bag.

2. An apparatus of the character described, comprising an elongated body forming a liquid container, a hopper at one end of the body and having communication with the latter, a horizontal slide for regulating the opening between the hopper and said body, an angular column rising from the other end of the body and having a downwardly directed discharge spout at its upper end for detachably securing a bag thereto, an inclined well formed on the body and directly beneath the said downwardly directed discharge spout, a foraminous plate covering said inclined well, a feed trough closed at one end and located within the body, a feed screw journaled in the body and rotatable in said trough, an elevating mechanism within the angular column for elevating substance from the trough and discharging the same into the said discharge spout and gearing entirely outside of the said body for operating said feed screw and elevating mechanism.

In testimony whereof, we affix our signatures hereto.

JOHN O. PIERSON.
EARL M. PIERSON.